July 12, 1949. E. GUETZKOW 2,476,189
LEAD GAUGE FOR SCREW THREADS
Filed Sept. 4, 1944 2 Sheets-Sheet 1
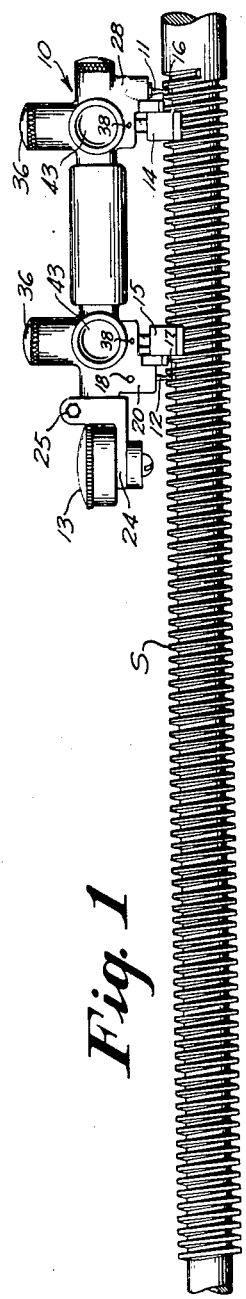
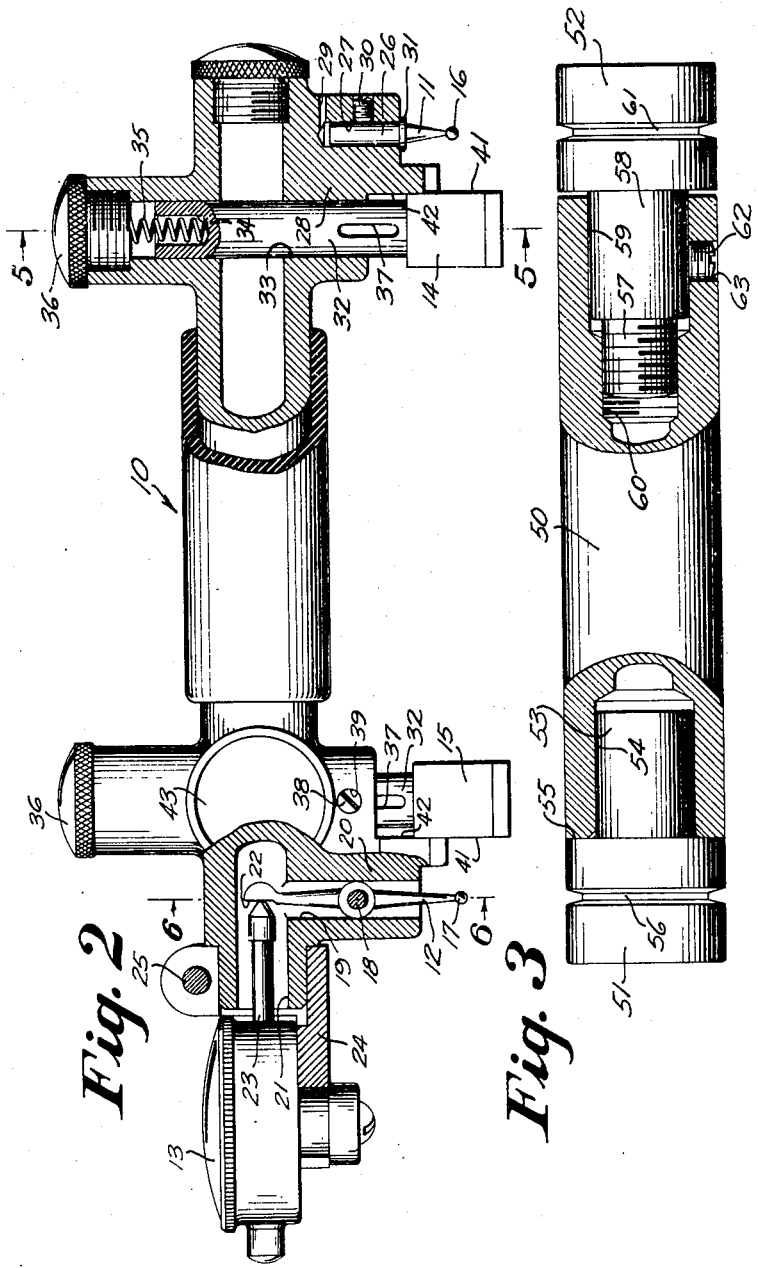
INVENTOR
EDWARD GUETZKOW
BY *W. D. O'Connor*
ATTORNEY July 12, 1949.　　　　　E. GUETZKOW　　　　　2,476,189
LEAD GAUGE FOR SCREW THREADS
Filed Sept. 4, 1944　　　　　　　　　　　　　　　2 Sheets-Sheet 2
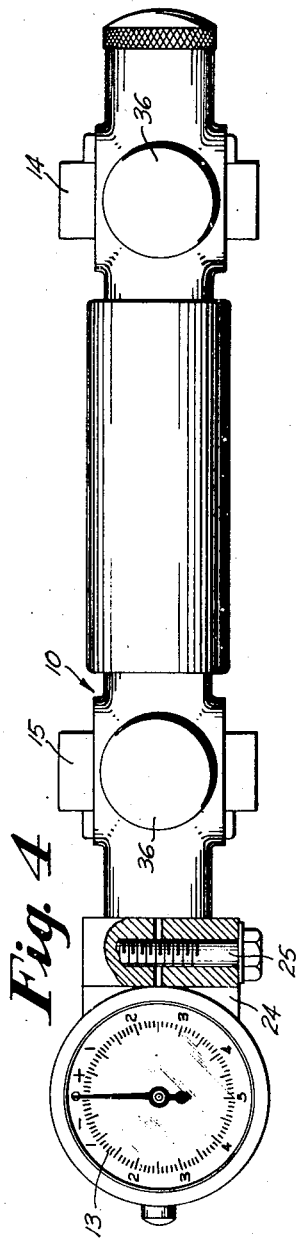
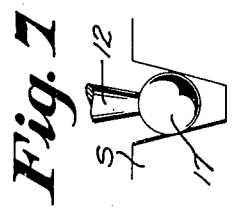
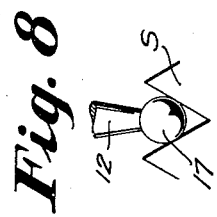
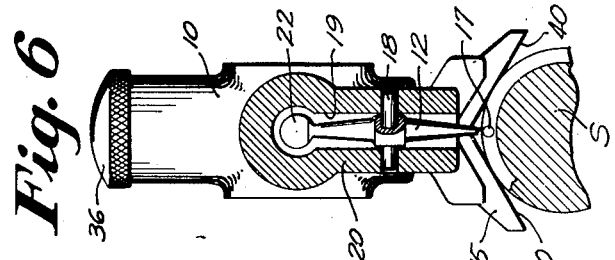
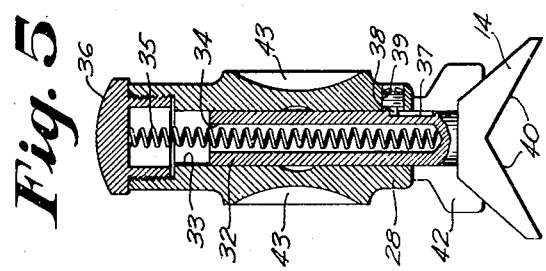
INVENTOR
EDWARD GUETZKOW
BY W. D. O'Connor
ATTORNEY Patented July 12, 1949

2,476,189

UNITED STATES PATENT OFFICE 2,476,189

LEAD GAUGE FOR SCREW THREADS

Edward Guetzkow, West Allis, Wis., assignor to Kearney & Trecker Corporation, West Allis, Wis., a corporation of Wisconsin Application September 4, 1944, Serial No. 552,597

8 Claims. (Cl. 33—199)

This invention relates to screw thread gauges and more particularly to an improved gauge for checking the accuracy and uniformity of the lead or pitch of the thread of a screw.

The primary object of the present invention is to provide a new and improved lead gauge that may be applied to a screw to afford a simple, rapid and effective check on the accuracy of the lead of the thread.

Another object of the invention is to provide a new and improved lead gauge provided with yieldably mounted axially spaced screw contacting members operative to support and properly position the gauge upon the screw in order that movement of the body of the gauge toward the screw will bring the thread contacting elements of the gauge into proper contact with threads of the screw to gauge the accuracy of the lead.

According to the present invention, a new and improved lead gauge has been provided, which is especially adapted to be used to determine accurately the amount and location of variations from the established standard in the lead, which may result from any of the several machining operations required to complete the thread of a screw. Since the degree of inaccuracy is materially reduced by gauging at each succeeding operation, it is possible, by this method, to produce a screw thread having an extremely accurate lead.

Other objects and advantages will become manifest from the following description of an illustrative embodiment of the present invention shown in the accompanying drawing.

In the drawing:

Figure 1 is a view in side elevation showing a lead gauge embodying the present invention, applied to the thread of a screw for checking the accuracy of the pitch or lead of the thread;

Figure 2 is an enlarged view in side elevation of the lead gauge shown in Figure 1, parts having been broken away to more clearly disclose internal structural details;

Figure 3 is an elevational view, with parts broken away, of a standard or master gauge bar for establishing the correct positioning of the movable thread contacting element of the gauge;

Figure 4 is a top plan view of the gauge shown in Figure 2;

Figure 5 is a vertical sectional view, taken substantially along the plane of the line 5—5 of Figure 2 and showing the yieldable mounting of one of the resilient positioning feet or saddles of the gauge;

Figure 6 is a vertical sectional view, taken substantially along the plane of the line 6—6 of Figure 2 and showing the pivotal mounting means for the movable thread contacting element of the gauge.

Figure 7 is an enlarged detailed view, showing the gauging position of a thread contacting element wherein points of its spherical surface are in contact with the adjacent sides of an acme thread to locate accurately the center of the thread; and, Figure 8 is a view similar to Figure 7, showing the gauging position of the thread contacting element in a standard or V-thread.

Referring more specifically to the drawing and particularly to Figures 1 and 2 thereof, the lead gauge there shown as illustrative of an instrument embodying the present invention comprises essentially an elongated cylindrical tubular body portion or frame element 10 that carries a pair of laterally projecting spaced thread contacting elements or members 11 and 12 in the region of its respective end portions. The intermediate portion of the cylindrical body 10 serves as a handle whereby the gauge may be applied to the thread of a screw shaft S, as shown in Figure 1, to measure variations from an established standard in the lead of the thread over the length thereof delimited by the spaced thread contacting elements. For measuring variations in the lead of the thread, the gauge is provided at one end with a sensitive dial indicator mechanism 13 that is arranged to be actuated by the adjacent thread contacting element 12, which is movably mounted in the body portion 10, the thread contacting element 11 being rigidly mounted at the other end of the body portion.

In order that measurements of the lead of the thread may be made precisely in direction parallel with the axis of the screw S, the lead gauge is provided with means for effecting positioning thereof on the screw with the thread contacting elements 11 and 12 disposed accurately in an axial plane of the screw. For this purpose, the gauge is provided at its ends, inwardly from the thread contacting elements 11 and 12, with inverted V-shaped screw-contacting positioning feet or saddle members 14 and 15, respectively. These members are resiliently mounted in the body portion 10, in such manner that when they are applied to the screw S, as indicated in Figures 1 and 6, they properly align the thread contacting elements with the axis of the screw. The body portion 10 may then be moved toward the screw by reason of the resilient mounting of the members 14 and 15, in order to bring the thread contacting elements 11 and 12 into proper engagement with the threads of the screw being measured.

As best shown in Figure 2, the thread contacting elements 11 and 12 are, respectively, provided with spherical thread contacting extremities on abutments 16 and 17, which engage adjacent faces of the screw threads in well known manner, as shown in the enlarged views, Figures 7 and 8. The thread contacting element 12 being movable, when the gauge is applied to the screw threads, as indicated in Figure 1, the distance subtended by the centers of the spherical extremities 16 and 17 constitutes an accurate measure of the lead of the screw S over that portion thereof, representing the range of the instrument.

As best shown in Figure 2, the movable thread contacting element 12 is in the form of a lever pivotally mounted at its midpoint on a pin 18, the lever passing freely through a radial bore 19, formed in a boss 20 projecting outwardly from the body portion 10. The upper end of the element or lever 12 is disposed within an axial bore 21 formed in the body portion 10 and presents a flat abutment surface 22 arranged to contact the end of a spring biased actuating bar 23 projecting toward it from the dial indicator 13, in such manner that the indicator is actuated in response to changes in the distance between the two thread contacting spherical extremities 16 and 17. The sensitive dial indicator 13 is mounted in the usual manner upon a bracket 24 that is releasably retained in desired position of adjustment upon one end of the body portion 10 of the gauge by the clamping action of a cap screw 25, which passes through a pair of ears formed on the bracket 24.

The fixed thread contacting element 11 of the gauge includes a stem 26 machined for a pressed fit in an axial bore 27 formed in a boss 28 projecting from the body portion 10. The base of the bore 27 is vented to atmosphere through a drilled hole 29. The element 11 is retained in fixed position within the bore 27 by a set screw 30, which is threadedly received in a bore passing through the wall of the boss 28 and disposed in pressure contact with the stem 26 of the element 11. A flange 31 formed on the element 11 serves to contact the lower surface of the boss 28 to position the element 11 accurately in the body portion 10.

The screw contacting feet or saddle members 14 and 15, which serve to properly position the gauge upon the screw S, are mounted in parallel spaced relationship and are disposed for axial movement in a common plane. The members 14 and 15 are identical in structure and operation and each includes a cylindrical stem 32, the stems adapted to be slidably received, respectively, in bores 33 passing through the bosses 28 and 20. Each stem 32 is provided with an axially disposed recess 34 adapted to house a coil spring 35, which serves to provide a yieldable mounting for normally urging each screw contacting member outwardly through contact with the base of the recess 34 and with a plug 36, which forms a closure for one end of each bore 33. As best shown in Figure 5, the movement of each screw contacting member, under action of the coil spring 35, is limited by the cooperating action between an axially disposed slot 37, formed in the stem 32, and a pin 38 threadedly received in a bore 39 in each of the bosses 20 and 28. The bottom surface of each of the screw contacting members 14 and 15 is provided with an inverted V-shaped notch, the notches having identical included angles and presenting angularly disposed centering faces or sides 40 constituting gauge surfaces adapted to contact the periphery of the screw S, as shown in Figure 6, to position the body portion 10 of the gauge in parallel alignment with the axis of the screw. While the vertexes of the inverted V-grooves are normally retained in alignment by the cooperating action between the pin 38 and the slot 37, additional guide means, in the form of cooperating flat guide surfaces 41 and 42 formed, respectively, on the screw contacting members and their cooperating bosses, are provided to insure the proper cooperating relationship between the aligned screw contacting elements.

As best shown in Figures 1 and 5, an alternative means is provided, in the form of thumb and finger recesses 43, for handling the gauge in applying it selectively at several positions along the screw. The recesses 43 are preferably disposed on the opposite sides of the gauge at the junction of the body portion 10 with the bosses 20 and 28 and they serve to afford a simple and effective means whereby the gauge may be gripped by the thumbs and forefingers of both hands to provide a ready means for applying the gauge to the screw and for applying a balanced pressure to move the thread contacting elements 11 and 12 into contact with the threads against the pressure of the coil springs 35 that function to normally retain the screw contacting members in their outermost positions.

In order to properly adjust the lead gauge, it is desirable that a master gauge bar, such as shown in Figure 3, be utilized to establish a standard of comparison. In the present instance, the master gauge bar comprises a cylindrical body element 50 provided with end plugs 51 and 52, which are, respectively, fixed and movable. The plug 51 is provided with a shank 53 adapted for pressed fit into an axial bore 54 formed in the element 50. The position of the plug 51 in the element 50 is fixed by contact of a shoulder 55 on the plug with the machined end of the element 50. An annular groove 56 having the exact contour of the side surfaces of a thread to be gauged is formed in the peripheral surface of the plug 51. The adjustable plug 52 is provided with a threaded portion 57 and a shank portion 58. The position of the plug 52 may be adjusted by turning it with the shank 58 rotating in an enlarged bore 59 and the threaded portion 57 thereof coacting with a concentric threaded bore 60 formed in the element 50. The head of the adjustable end plug 52 is also provided with an annular groove 61 identical with the groove 56 formed in the stationary plug 51. The plug 52 is rotated with respect to the body portion 50 of the master gauge bar until the spacing between the center of the grooves 56 and 61 is equal to a distance which represents an exact multiple of the pitch of the thread of the screw to be gauged. When the plug 52 has been adjusted to proper axial position, it may be releasably retained by tightening a set screw 62 threaded in a bore 63 that passes through the wall of the body portion 50 surrounding the enlarged bore 59.

With the master gauge bar properly adjusted, the thread gauge may be applied thereto by placing the screw contacting members 14 and 15 in contact with the cylindrical surface of the element 50 and applying a downward pressure to bring the thread contacting elements 11 and 12 into contact with the side surfaces of the grooves 56 and 61. With the lead gauge thus positioned upon the master gauge bar 50, the dial of the indicator 13 may be manually rotated in well known manner to a position wherein the zero mark on the face of the dial will lie in alignment with the pointer of the indicator. With the lead gauge thus properly set, it may be applied to the threads of the screw to be checked to provide a visual means of determining the amount of inaccuracy of the lead of successive portions of the screw thread to be gauged.

Readings of the step-by-step measurements taken along the screw thread will serve to indicate the position and amounts of the several inaccuracies found along the extent of the thread to be gauged. With the readings thus taken, it will be possible to determine the most desirable starting point for either the rough or finish grinding operation so that the amount of material to be removed from the adjacent faces of successive threads will be fairly uniform to obviate uneven or excessive wear upon the surfaces of the grinding tool. It has been found that variations in stock material utilized in the formation of screws is such that under the rough machining operation the screw will frequently stretch an amount up to six or eight-thousandths of an inch in a length of five feet. When this condition occurs, the use of the lead gauge serves as a rapid method of checking to determine the position and amounts of these inaccuracies, so that the rough and finish grinding operations may be accomplished in a manner to insure the complete cleaning up of the sides of the threads throughout the entire length of the screw, and without requiring that the grinding wheel remove practically all of the excessive material from either the leading or trailing side of the screw thread.

From the foregoing description of an illustrative embodiment of the present invention, it will be seen readily that a simple and effective lead gauge has been provided, which may be utilized in quickly and accurately determining the starting point for grinding and finishing the threads of a screw. The simple operating mechanism for effecting movement of the pointer of the indicator dial constitutes the only operating part of the gauge, the position of the movable thread contacting element 12 being dictated by the contact of its spherical surface 17 with the adjacent sides of successive threads on the screw. As the element 12 rocks upon the pivot pin 18, the bar contacting surface 22 of the element 12 will move either toward or away from the indicator dial 13 and since the actuating bar 23 of the indicator is normally urged outwardly, a constant pressure contact between the end of the bar 23 and the surface 22 of the movable element 12 will be maintained. The variation of the spacing between the fixed and movable elements 11 and 12 may be observed readily by the position of the pointer on the indicator dial and may be read as plus or minus quantities in ten-thousandths of an inch.

While the invention has been described in considerable detail in the foregoing specification, it is to be understood that various changes may be made in its embodiment without departing from or sacrificing any of the advantages of the invention as defined in the subjoined claims.

I claim:

1. A lead gauge for screw threads comprising, a body portion, a pair of screw contacting members presenting V-shaped screw contacting notches and slidably mounted in coplanar parallel relationship in said body portion, guide and motion limiting means for each of said screw contacting members, spring means for yieldably retaining said members in their outer extreme positions, said members being operative to properly position the gauge on the screw through engagement of said notches with the periphery of the screw, a pair of lead gauging elements mounted in spaced relationship in the plane of said screw contacting members, one of said elements being fixedly mounted and the other of said elements being movably mounted in the plane, a sensitive indicator operatively associated with said movable element, and means for setting said indicator to establish a standard lead, whereby variations from the established standard are visually indicated when said gauging elements are moved into contact with the threads against the yielding pressure of said screw contacting members.

2. A thread lead gauge, comprising a cylindrical body portion constituting a handle, a dial indicator attached to one end of said handle, a fixed thread engaging abutment projecting laterally from said cylindrical handle, a movable thread engaging abutment projecting laterally from said handle at a position spaced from said fixed abutment and in the same axial plane of said handle, linkage operatively connecting said movable abutment with said dial indicator in manner to register thereon variations in the distance between said thread engaging abutments for gauging the lead of a thread engaged thereby, and a pair of aligning shoes resiliently mounted on said handle for movement in the axial plane of said thread engaging abutments, said shoes presenting V-shaped faces for engaging the periphery of a thread to be gauged for aligning said gauge and said abutments with the axis of the thread, said abutments being movable into gauging engagement with the thread by reason of the resilient action of said aligning shoes.

3. A thread lead gauge comprising a body portion constituting a handle, a pair of spaced thread engaging abutments projecting laterally from said handle in an axial plane thereof, and a pair of aligning shoes resiliently mounted on said handle for movement in the axial plane of said thread engaging abutments, said shoes presenting V-shaped faces for engaging the periphery of a thread to be gauged for aligning said gauge and said abutments with the axis of the thread, said abutments being movable into gauging engagement with the thread by reason of the resilient action of said aligning shoes.

4. In a thread lead gauge, a body member, a pair of thread contacting elements projecting from said body member at spaced positions, a pair of aligning guide members carried by said body member at spaced positions and presenting V-shaped screw contacting notches adapted to effect alignment of said thread contacting elements with the axis of a thread being gauged, and resilient means supporting said body member on said guide members in a manner to permit relative radial movement of said body member and thread contacting elements into gauging engagement with the thread being gauged.

5. In a thread lead gauge, a pair of spaced aligning shoes presenting V-shaped screw contacting notches adapted to engage a thread to be gauged in a manner to establish axial alignment therewith, a body element resiliently supported upon said aligning shoes for movement relative thereto in direction radially of the thread to be gauged, a pair of relatively movable spaced thread contacting members carried by said body element and movable therewith relative to said aligning shoes in an axial plane of the thread being gauged, and indicating mechanism carried by said body element and responsive to relative movement of said thread contacting members in said axial plane through engagement with the thread being gauged to indicate variations in lead of the thread from a predetermined standard.

6. A thread lead gauge comprising a pair of spaced aligning shoes presenting V-shaped screw contacting notches adapted to engage a thread to be gauged in predetermined relationship with its axis, a body member slidably and resiliently mounted on said aligning shoes for movement in direction radially of the thread to be gauged, and a pair of spaced thread contacting members carried by said body member in position to engage the thread in an axial plane when moved radially into contact with it through resilient movement of said body member relative to said aligning shoes.

7. A thread lead gauge comprising, a pair of spaced aligning shoes presenting V-shaped centering faces for engaging the periphery of a thread to be gauged and thereby establishing alignment with its axis, a pair of spaced thread contacting members, a frame carrying said members, said frame being resiliently mounted on said aligning shoes for movement radially of the thread to be gauged in an axial plane thereof, and means to indicate the distance between said thread contacting members for measuring the lead of the thread when said members are engaged with it under guidance of said resiliently mounted aligning shoes.

8. In a gauge for checking the lead of a screw thread, a tubular member constituting a frame, a pair of thread contacting elements projecting radially from said frame in axially spaced relationship thereon one of said elements being fixed to said frame, means movably supporting the other of said elements on said frame for movement axially thereof, a sensitive dial indicator mounted on said frame and operatively connected to indicate axial movements of said movably supported thread contacting element in effecting a thread gauging operation, a pair of positioning feet extending radially from said frame in spaced relationship in the plane of said thread contacting elements said feet presenting angularly disposed gauge surfaces adapted to engage the periphery of a screw being checked in a manner to align said gauge frame therewith, means slidably carrying said feet on said frame for movement radially thereof, and resilient means disposed to urge said positioning feet outwardly from said frame, the arrangement being such that said positioning feet may be engaged with a screw to align said frame therewith and said frame may then be pressed toward the screw in opposition to said resilient means to engage said thread contacting elements with the threads of the screw in proper axial alignment for accurately gauging the lead of the screw thread.

EDWARD GUETZKOW.

REFERENCES CITED

The following references are of record in the file of this patent:

UNITED STATES PATENTS

| Number | Name | Date |
| --- | --- | --- |
| 1,281,805 | Metzger et al. | Oct. 15, 1918 |
| 1,339,573 | Pettibone | May 11, 1920 |
| 1,378,287 | Shaylor | May 17, 1921 |
| 1,442,333 | Gaugh | Jan. 16, 1923 |
| 1,467,146 | Ellery | Sept. 4, 1923 |
| 1,504,683 | Fusco | Aug. 12, 1924 |
| 1,656,314 | Buckingham | Jan. 17, 1928 |
| 2,233,626 | McClure | Mar. 4, 1941 |

FOREIGN PATENTS

| Number | Country | Date |
| --- | --- | --- |
| 455,195 | Germany | Jan. 25, 1928 |
| 132,354 | Switzerland | June 17, 1929 |